US007109979B2

(12) United States Patent
Moyne et al.

(10) Patent No.: US 7,109,979 B2
(45) Date of Patent: Sep. 19, 2006

(54) SYSTEM AND METHOD FOR RECORDING WRITING PERFORMED ON A SURFACE

(75) Inventors: William P. Moyne, Cambridge, MA (US); Christopher M. Cacioppo, Somerville, MA (US); Joseph F. Petrie, Jr., Westwood, MA (US); Hector Padilla, Medford, MA (US); Erik James Pedersen, Dover, NH (US); Kurt E. Guggenberger, North Andover, MA (US); Wilfred Collier, Peabody, MA (US); Matthew D. Verminski, Somerville, MA (US); Anson Wooding, Allston, MA (US); Curtis Nauseda, Somerville, MA (US)

(73) Assignee: Virtual Ink Corporation, Brighton, MA (US)

( * ) Notice: Subject to any disclaimer, the term of this patent is extended or adjusted under 35 U.S.C. 154(b) by 373 days.

(21) Appl. No.: 10/071,556

(22) Filed: Feb. 8, 2002

(65) Prior Publication Data

US 2003/0151596 A1   Aug. 14, 2003

(51) Int. Cl.
*G09G 5/00* (2006.01)
(52) U.S. Cl. ..................... 345/179; 345/156
(58) Field of Classification Search ............ 178/18.02, 178/18.03, 18.04, 19.01, 19.02, 19.03, 19.04, 178/18.01–19; 345/156, 179, 158, 162, 164, 345/165, 166, 169, 176, 157, 159, 172, 173, 345/175, 182, 184
See application file for complete search history.

(56) References Cited

U.S. PATENT DOCUMENTS

| 3,821,469 | A |  | 6/1974 | Whetstone et al. |
| 4,246,439 | A |  | 1/1981 | Romein |
| 4,688,933 | A |  | 8/1987 | Lapeyre |
| 4,777,329 | A |  | 10/1988 | Mallicoat |
| 4,814,552 | A | * | 3/1989 | Stefik et al. ............. 178/19.02 |
| 5,581,783 | A | * | 12/1996 | Ohashi ......................... 710/5 |
| 5,717,168 | A | * | 2/1998 | DeBuisser et al. ....... 178/18.04 |
| 6,100,877 | A |  | 8/2000 | Chery et al. ................ 345/178 |
| 6,104,387 | A |  | 8/2000 | Chery et al. ................ 345/179 |
| 6,111,565 | A |  | 8/2000 | Chery et al. ................ 345/179 |
| 6,124,847 | A |  | 9/2000 | Chery et al. ................ 345/173 |
| 6,147,681 | A |  | 11/2000 | Chery et al. ................ 345/179 |
| 6,177,927 | B1 |  | 1/2001 | Chery et al. ................ 345/173 |
| 6,191,778 | B1 |  | 2/2001 | Chery et al. ................ 345/173 |
| 6,211,863 | B1 |  | 4/2001 | Chery et al. ................ 345/179 |
| 6,217,686 | B1 |  | 4/2001 | Kelley, III et al. ........ 156/73.1 |
| 6,232,962 | B1 |  | 5/2001 | Davis et al. ................ 345/177 |
| 6,292,180 | B1 | * | 9/2001 | Lee ............................ 345/177 |
| 6,577,299 | B1 | * | 6/2003 | Schiller et al. ............. 345/179 |

(Continued)

FOREIGN PATENT DOCUMENTS

WO    WO 99/59130    11/1999

(Continued)

*Primary Examiner*—Bipin Shalwala
*Assistant Examiner*—Nitin Patel
(74) *Attorney, Agent, or Firm*—Kirkpatrick & Lockhart Nicholson Graham LLP

(57) ABSTRACT

A system and method for recording writing performed on a surface includes a stylus and a detector assembly having a base appliance and a personality module removably attachable to the base appliance. The detector assembly includes a storage medium which allows the system of the present invention to track and record writing while not connected to a processing device such as a computer, printer, wireless device or hand-held device.

78 Claims, 8 Drawing Sheets

U.S. PATENT DOCUMENTS

| | | |
|---|---|---|
| 2002/0055788 A1* | 5/2002 | Petrie et al. .................... 700/2 |
| 2002/0060665 A1* | 5/2002 | Sekiguchi et al. .......... 345/157 |
| 2002/0070055 A1 | 6/2002 | Collier et al. |
| 2002/0175902 A1* | 11/2002 | Hisasue ....................... 345/179 |
| 2002/0176577 A1* | 11/2002 | Xu .............................. 380/258 |
| 2003/0071754 A1* | 4/2003 | McEwan .................... 342/464 |

FOREIGN PATENT DOCUMENTS

| | | |
|---|---|---|
| WO | WO 01/95083 A2 | 12/2001 |
| WO | WO 02/25577 A2 | 3/2002 |
| WO | WO 02/097721 A2 | 12/2002 |

* cited by examiner

SYSTEM AND METHOD FOR RECORDING WRITING PERFORMED ON A SURFACE

FIELD OF THE INVENTION

The invention relates to a system and method for recording writing performed on a surface and, more particularly, to a system and method in which the position of a stylus on the writing surface is tracked.

BACKGROUND OF THE INVENTION

Existing technologies for capturing and storing handwritten notes include digitized writing surfaces such as electronic whiteboards or SmartBoards™. Such electronic whiteboards typically either photocopy the entire writing surface or serve as the actual input device, such as an electronic template, for capturing the handwritten data. The whiteboards may be active or passive electronic devices in which the user writes on the surface with a specialized stylus. The active devices may be touch sensitive or responsive to a light or laser pen such that the whiteboard is the detector that detects the active signal. Passive electronic boards may use large, expensive, board-sized photocopying mechanisms. Previous whiteboard systems tend to be large, cumbersome, expensive, and immobile.

SUMMARY OF THE INVENTION

In general, in one aspect, the invention features a system for recording a writing performed on a surface. A stylus includes a first signal transmitter for transmitting position signals corresponding to positional data representative of the writing when the stylus is disposed adjacent to the surface. A detector assembly includes a plurality of position signal receivers for receiving the position signals transmitted by the stylus and further comprising a storage medium for recording the positional data.

Implementations of the invention may also include one or more of the following features. The stylus may include a second signal transmitter for transmitting timing signals and the detector assembly may include a timing signal receiver for receiving the timing signals transmitted by the stylus. The timing signals may be infrared light signals. The timing signal receiver may be an infrared detector. The position signals may be ultrasound signals. The detector assembly may include logic for converting the position signals to the positional data.

The system may include a processing unit for displaying the positional data representative of the writing. The processing unit may be a desktop computer, a laptop computer, a wireless device, a hand-held device, a printer, or any combination thereof. The system may include a display device and a user interface. The system may include an eraser having a third signal transmitter for transmitting position signals corresponding to positional information representative of removal of the writing when the eraser is disposed adjacent to the surface.

The plurality of position signal receivers may be condenser microphones. The condenser microphones may be omnidirectional condenser microphones, pre-polarized condenser microphones, condenser microphones having a frequency range of about 1 Hz to about 100 kHz, or condenser microphones having a frequency range of about 50 Hz to about 20 kHz.

The detector assembly may include a base appliance for receiving the position signals from the first signal transmitter and for recording the positional data and may include a personality module removably attachable to the base appliance for providing a user interface for the detector assembly. The stylus may include a second signal transmitter for transmitting timing signals and the base appliance may include a timing signal receiver for receiving the timing signals from the stylus. The timing signal receiver may be an infrared detector. The base appliance may include logic for converting the position signals to positional data. The plurality of position signal receivers may be condenser microphones. The condenser microphones may be omnidirectional condenser microphones, pre-polarized condenser microphones, condenser microphones having a frequency range of about 1 Hz to about 100 kHz, or condenser microphones having a frequency range of about 50 Hz to about 20 kHz. The personality module may be in communication with a computer, a wireless device, a network, a printer, or a removable storage medium. The personality module may include logic. The detector assembly may be powered by a battery or an external power supply.

The detector assembly may include an attachment mechanism for permanently or removably attaching the detector assembly to the writing surface. The detector assembly may include a security mechanism for securing the detector assembly to the writing surface. The detector assembly may include a hinge mechanism for folding the detector assembly. The hinge mechanism may include a positive feedback locking mechanism. The detector assembly may have a plurality of power states. The writing may be include erasing. The surface may be a whiteboard, a blackboard, a clipboard, a desktop, a wall, a projection screen, a flip chart tablet, a glass pane, or an active display.

In general, in another aspect, the invention features a system for recording a writing performed on a surface. A stylus includes a first signal transmitter for transmitting position signals corresponding to positional data representative of the writing when the stylus is disposed adjacent to the surface. A detector assembly includes a plurality of condenser microphones for receiving the position signals transmitted by the stylus.

Implementations of the invention may also include one or more of the following features. The detector assembly may include logic for converting the position signals to the positional data, and a storage medium for recording the positional data. The stylus may include a second signal transmitter for transmitting timing signals and the detector assembly may include an infrared detector for receiving the timing signals transmitted by the stylus.

In general, in another aspect, the invention features a detector for use in a transcription system in which the transcription system includes a stylus for transmitting signals when the stylus is disposed adjacent to a surface. A base appliance includes a plurality of signal receivers for receiving position signals transmitted by the stylus, logic for converting the position signals to positional data, and an internal local storage medium for recording the positional data. A personality module removably attachable to the base appliance provides a user interface for the detector.

Implementations of the invention may also include one or more of the following features. The base appliance may include a timing signal receiver for receiving timing signals transmitted by the stylus. The timing signal receiver may be an infrared detector. The plurality of signal receivers may be condenser microphones. The condenser microphones may be omnidirectional condenser microphones, pre-polarized condenser microphones, condenser microphones having a frequency range of about 1 Hz to about 100 kHz, or condenser microphones having a frequency range of about 50 Hz to about 20 kHz. The user interface of the personality module may be buttons, LEDs, LCDs, buzzers, or any combination thereof. The personality module may include logic.

The detector may be powered by a battery or an external power supply. The detector may include an attachment mechanism for permanently or removably attaching the detector to the writing surface. The detector may include a security mechanism for securing the detector to the writing surface. The detector may include a hinge mechanism for folding the base appliance. The timing signals may be infrared light signals. The position signals may be ultrasound signals.

In general, in another aspect, the invention features a detector for use in a transcription system in which the transcription system includes a stylus for transmitting signals when the stylus is disposed adjacent to a surface. A base appliance includes a plurality of condenser microphones for receiving position signals transmitted by the stylus, the position signals corresponding to positional data representative of writing performed on the surface. A personality module removably attachable to the base appliance provides a user interface for the detector. Implementations of the invention may include the base appliance having logic for converting the position signals to the positional data, and an internal local storage medium for recording the positional data.

In general, in another aspect, the invention features a method for recording a writing performed on a surface. A detector including a plurality of condenser microphones capable of receiving an acoustic signal is provided. The acoustic signal is sent from a stylus at a position on the surface when the stylus is disposed adjacent to the surface. The acoustic signal is received with the plurality of condenser microphones. The acoustic signal is converted to positional data. The positional data is recorded. The sending step, receiving step, converting step, and recording step are repeated to produce an image corresponding to the writing performed on the surface.

Implementations of the invention may also include one or more of the following features. The condenser microphones may be omnidirectional condenser microphones. The condenser microphones may be pre-polarized condenser microphones. The acoustic signal may be an ultrasound signal. The method may include sending a timing signal from the stylus when the stylus is disposed adjacent to the surface and receiving the timing signal a timing signal receiver located on the detector. The timing signal may be an infrared light signal and the timing signal receiver may be an infrared detector.

The detector may record the positional data. The method may include downloading the positional data from the detector to a processing unit and displaying the positional data by the processing unit. The method may include preparing the processing unit for recording the writing. The processing unit may be a desktop computer, a laptop computer, a wireless device, a hand-held device, a printer, or any combination thereof. The method may include displaying the positional data by a processing unit. The processing unit may be a desktop computer, a laptop computer, a wireless device, a hand-held device, a printer, or any combination thereof. The processing unit may record the positional data.

In general, in another aspect, the invention features a method for recording a writing performed on a surface. A position signal is sent from a stylus when the stylus is disposed adjacent to the surface. The position signal is received with a detector including a plurality of signal receivers. The position signal is converted to positional data using logic located on the detector. The positional data is recorded on a storage medium located on the detector. The sending step, receiving step, converting step, and recording step is repeated to produce an image corresponding to the writing.

Implementations of the invention may also include one or more of the following features. The plurality of signal receivers may include condenser microphones. The condenser microphones may be omnidirectional condenser microphones. The condenser microphones may be pre-polarized condenser microphones. The position signal may be an ultrasound signal. The method may include sending a timing signal from the stylus when the stylus is disposed adjacent to the surface and receiving the timing signal with the plurality of signal receivers. The timing signals may be infrared light signals and the plurality of signal receivers may include infrared detectors.

The method may include downloading the positional data from the detector to a processing unit. The processing unit may be a desktop computer, a laptop computer, a wireless device, a hand-held device, a printer, or any combination thereof. The method may include displaying the positional data by the processing unit. The method may include repeating the sending step, the receiving step, the converting step, and the displaying step to produce an image corresponding to the writing.

An advantage of the present invention is that it provides a compact, low profile, portable transcription system for recording writing performed on a surface.

Another advantage of the present invention is that the transcription system is able to track and record writing while not connected to a processing device such as a computer, printer, wireless or hand-held device.

An additional advantage of the present invention is the detector includes a removable personality module which allows the detector to perform a variety of different functions with unique interfaces.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference symbols in the various drawings indicate like elements.

DETAILED DESCRIPTION OF THE INVENTION

The present invention relates to a system and method for recording writing performed on a surface. Writing includes the formation or modification of any type of image on a surface by a writing element, including printing, drawing, sketching, erasing and the like. The surface may be any surface on which writing may be performed. Examples of suitable surfaces include, but are not limited to, whiteboards, blackboards, clipboards, desktops, walls, projection screens, flip chart tablets, glass panes, and active displays, such as tablet PC's, whether or not these surfaces are covered by a material such as paper, glass, metal, or plastic which can be written upon directly. The surface is preferably a relatively smooth and flat surface, although it is noted that the surface may have a degree of curvature.

Figure 1:
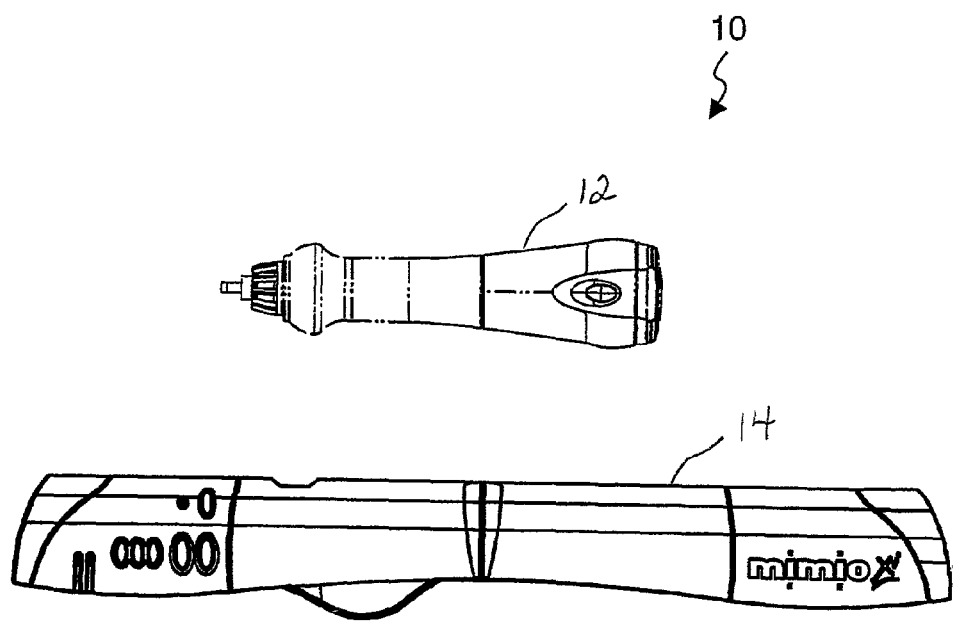
FIG. 1 is a schematic view of a transcription system according to an embodiment of the present invention.

FIG. 1 shows a transcription system used to record a writing performed on a surface according to one embodiment of the present invention. The transcription system 10 includes a stylus 12 and a detector assembly 14. The detector assembly 14 records the writing (also referred to as "ink") performed by the stylus 12 by detecting the position of the stylus 12 on the writing surface at multiple times, each position detected serving to form a point on the recorded image. When the position of the stylus 12 is detected at a sampling rate that is fast relative to the speed with which the stylus 12 is moved during writing, an image is recorded corresponding to what has been written. The stylus 12 includes one or more signal transmitters for transmitting a ranging medium and the detector assembly 14 includes a plurality of signal receivers for receiving a ranging medium. A variety of ranging media may be used including, for example, ultrasound, radar, radio frequency (RF), infra-red (IR) light and/or visible light. Each point of the recorded image is determined based on the time that it takes for the ranging medium or signal to travel between the stylus 12 and the detector assembly 14, referred to as the signal's time of flight.

Various methods may be employed in order to determine the position of the stylus 12 relative to the detector assembly 14. For example, a timing signal may be transmitted from the stylus 12 to the detector assembly 14 in order to synchronize the stylus 12 with the detector assembly 14. Position signals are then propagated radially from the stylus 12 and received by the detector assembly 14 at a time that is dependent on the distance between the stylus 12 and the detector assembly 14 when each position signal is produced. Since the position signals are transmitted at a known time after the timing signal is transmitted, the time of flight of each position signal to the detector assembly 14 may be determined. As described in more detail below, the detector assembly 14 contains logic and processing capabilities for performing various calibration and calculation functions necessary for using the time of flight data to determine the position of the stylus 12 relative to the detector assembly 14.

In general, logic is the arrangement of circuit elements, such as in a computer, needed for computation. The logic may employ a variety of methodologies for determining the position of the stylus 12 including, for example, triangulation or a look-up table containing different positions associated with the different times of flight to the detector assembly 14. It will be apparent to those of ordinary skill in the art that other methods may also be used, such as the detector assembly 14 may transmit the timing signals and the stylus 12 may transmit position signals in response, the stylus 12 may transmit the timing signals and the detector assembly 14 may transmit the position signals in response, the stylus 12 may be passive and the detector assembly 14 may transmit and receive signals which reflect off the stylus 12, the detector assembly 14 determining position based on an angle-of-arrival of the signals.

A variety of timing signals may be used. In general, the timing signal should be at least as fast as the position signal, and is preferably significantly faster than the position signal. When the timing signal is significantly faster than the position signal, e.g., the speed of light compared to the speed of sound, it is possible to disregard the time of flight of the timing signal when determining the time of flight of the position signal. In one embodiment the timing signal travels at the speed of sound, and in another embodiment the timing signal travels at the speed of light. In a particular embodiment, the timing signal is a form of electromagnetic radiation, such as an IR or RF signal. Alternatively, the timing signal may be ultrasound. A variety of position signals may be used. In one embodiment, the position signal is ultrasound. In another embodiment, the position signal is a form of electromagnetic radiation, such as micro-impulse radar, which yields an effective time of flight for electromagnetic signals.

Figure 2:
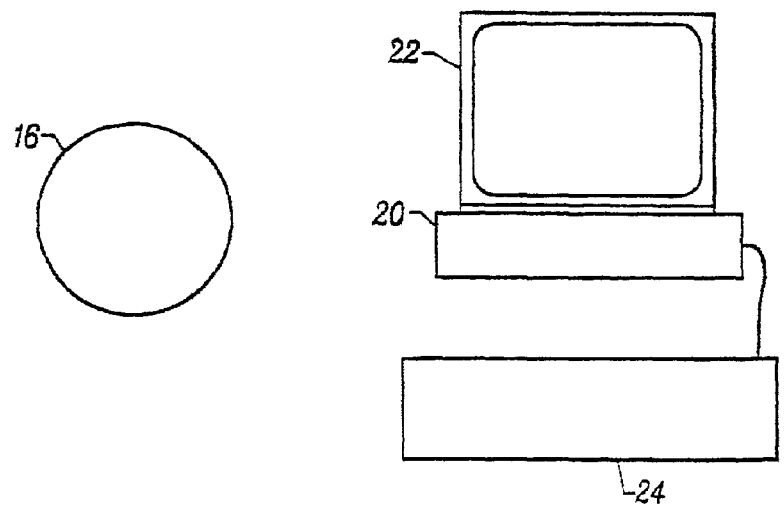
FIG. 2 is a schematic view of optional components used with the transcription system according to an embodiment of the present invention.

Referring also to FIG. 2, an eraser 16, a processing unit 20, a display device 22, and a user interface 24 may be used in the transcription system 10 according to an embodiment of the present invention. The eraser 16 includes an eraser pad, a position signal transmitter and a timing signal transmitter (not shown). In operation, the eraser 16 is positioned such that the eraser pad is pushed against the writing surface 26. The eraser pad is constructed from a material which erases the writing element media from the writing surface 26. For instance, when the writing element is a white board marker, the eraser pad can be a typical white board eraser. As a result, contact between the eraser pad and the writing surface 26 can serve to erase a portion of the image from the writing area. The position of the eraser 16 relative to the detector assembly 14 may be detected in a similar manner as described above with respect to the stylus 12.

The signal transmitted by the timing signal transmitter on the eraser 16 may vary from the signal transmitted by the timing signal transmitter on the stylus 12. Alternatively, the signal transmitted by the position signal transmitter on the eraser 16 may optionally be different from the signal transmitted by the position signal transmitter on the stylus 12. The detector assembly 14 may then distinguish that the signals being received are from the eraser 16 as opposed to the stylus 12. When the detector assembly 14 detects that the eraser 16 is being used, the detector assembly 14 "erases" or digitally deletes the recorded image according to the position of the eraser 16 on the writing surface 26. The portion of the written image which is erased is the portion of the written image in contact with any portion of the eraser pad, and not simply the position of the position signal transmitter on the eraser 16. Accordingly, the detector assembly 14 includes logic which accounts for the portion of the written image actually contacted by the eraser pad. The detector assembly 14 may calculate an approximate eraser area which matches the eraser pad dimensions. As the eraser 16 is moved about the writing surface 26, the portion of the recorded image which falls within the approximate eraser area is erased or digitally deleted from the recorded image. The size of the approximate eraser area may be adjusted so that it matches the actual size of the eraser pad dimensions. Similarly, the approximate eraser area may be calculated to have different shapes which match the shape of the eraser pad dimensions.

The transcription system 10 of the present invention has the ability to track and record writing while not connected to a processing unit 20 such as a computer, printer, wireless or hand-held device, or other processing device. As described in more detail below, the detector assembly 14 includes an internal local storage medium which allows the detector assembly 14 to record the data and display the stored information at a later time using processing unit 20. When the processing unit 20 is a desktop computer, a display device 22 and user interface 24 may also be used. The display device 22 may be a typical device which displays an image such as a monitor, a projector, an active surface, or similar device. The user interface 24 may be a typical device which allows users to interact with the processing unit 20 or other processor based systems. For instance, the user interface 24 may include a keyboard, a mouse, and/or a touchpad disposed on the display device 22. When the processing unit 20 is a laptop computer, wireless or hand-held device, the display device 22 and user interface 24 may be integral with the processing unit 20. The transcription system 10 of the present invention is also capable of tracking writing and displaying the image in real time (also referred to as "live ink") when the detector assembly 14 is connected to the processing unit 20, display device 22, and user interface 24 at the time the image is being written.

Figure 3:
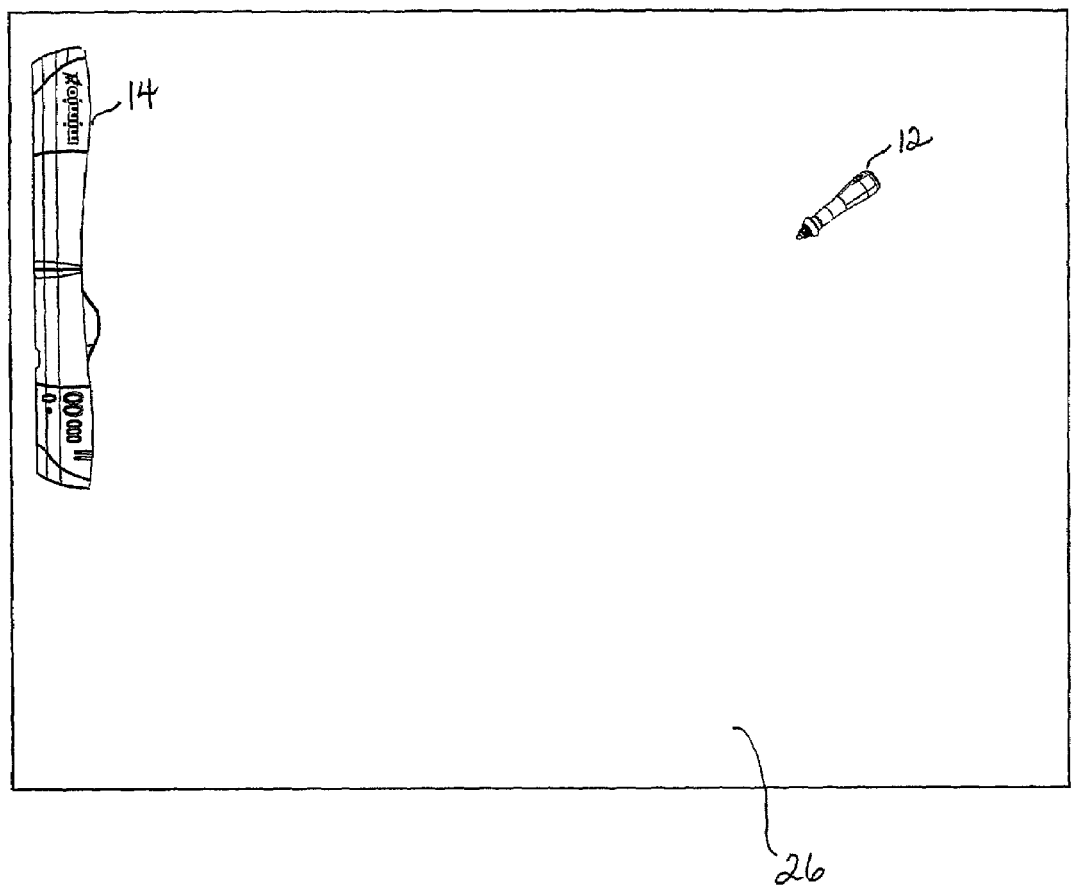
FIG. 3 is a schematic view of a detector assembly mounted on a writing surface according to an embodiment of the present invention.

FIG. 3 is a schematic view of the transcription system 10 shown in FIG. 1 installed on a writing surface 26. The detector assembly 14 may be permanently or removably affixed to the writing surface 26. The detector assembly 14 may be placed anywhere on the writing surface; however, it is generally preferred that the detector assembly 14 be positioned adjacent to one edge of the writing surface 26. Alternatively, the detector assembly 14 may be an integral part of the writing surface 26 (not shown).

As shown in FIGS. 4A–4D and FIG. 5, the detector assembly 14 includes a base appliance 30 and a personality module 32 removably attached to one end of the base appliance 30. The base appliance 30 contains all the components, including signal receivers, hardware and firmware, which enable the writing stylus 12 or eraser 16 to be tracked on the writing surface 26 and recorded. The personality module 32 contains user-related interactions, inputs, outputs, and/or displays, such as buttons, light emitting diodes (LEDs), liquid crystal displays (LCDs) and buzzers, and logic to perform a variety of tasks, such as communication and connections to external hosts as well as stand-alone functions. LCDs include a variety of displays, such as alphanumeric, icons, and/or image matrix, to display user interface information and/or positional data. An optional name plate 34 located on the upper surface of the base appliance 30 allows the user to customize the detector assembly 14.

A variety of configurations may be used for the plurality of position signal receivers and timing signal receivers on the base appliance 30. In general, the position signal receivers are located at a known distance apart and preferably as far apart as possible. In one embodiment, the position signal receivers 36 are located near the ends of the base appliance 30. In general, the timing signal receivers are located such that the ranging medium is detected over the maximum amount of area on the writing surface 26. In one embodiment, the timing signal receivers 38 are located near the middle of the base appliance 30. It will be apparent to those of ordinary skill in the art that other configurations may also be used.

Figure 4A:
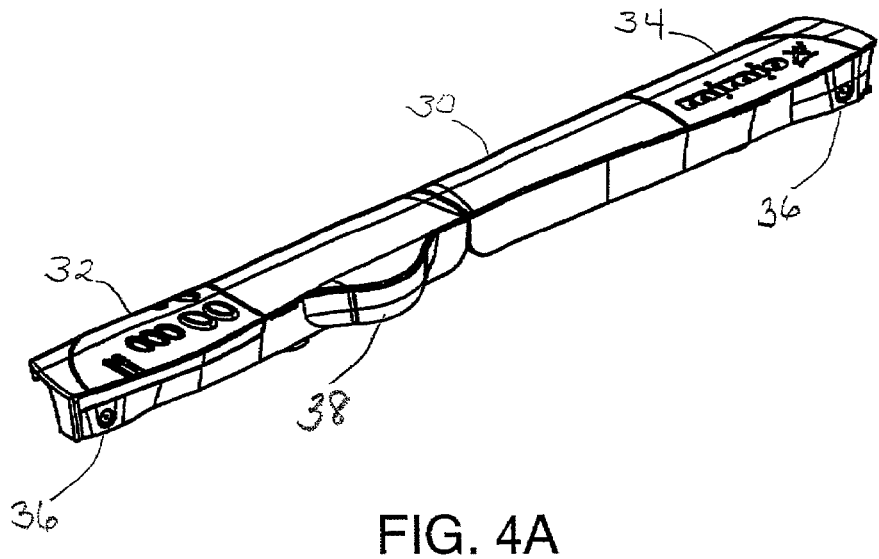
FIG. 4A is a perspective view of the detector assembly according to an embodiment of the present invention.
Figure 4B:
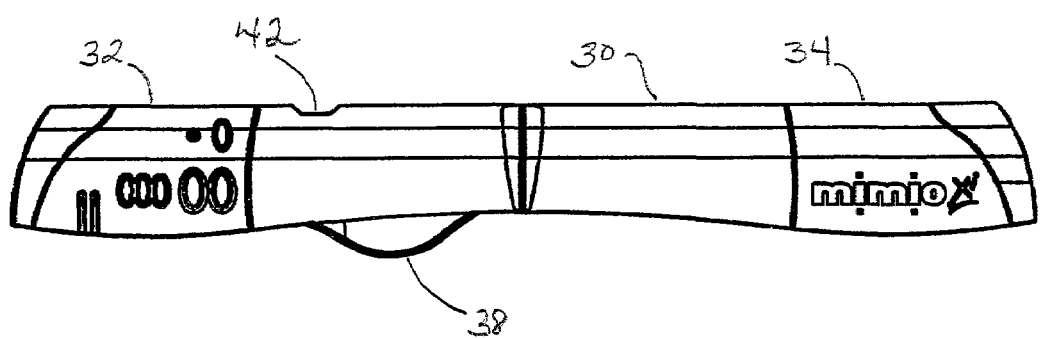
FIG. 4B is a top view of the detector assembly according to an embodiment of the present invention.
Figure 4C:
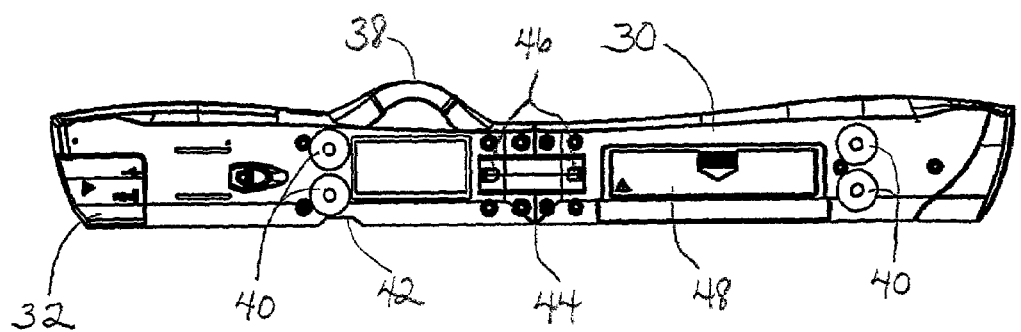
FIG. 4C is a bottom view of the detector assembly according to an embodiment of the present invention.
Figure 4D:
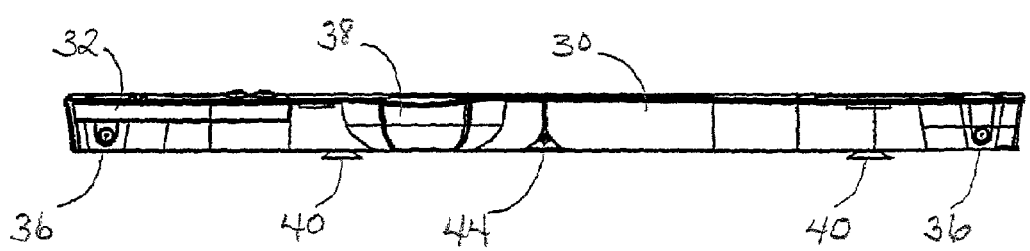
FIG. 4D is a side view of the detector assembly according to an embodiment of the present invention.
Figure 5:
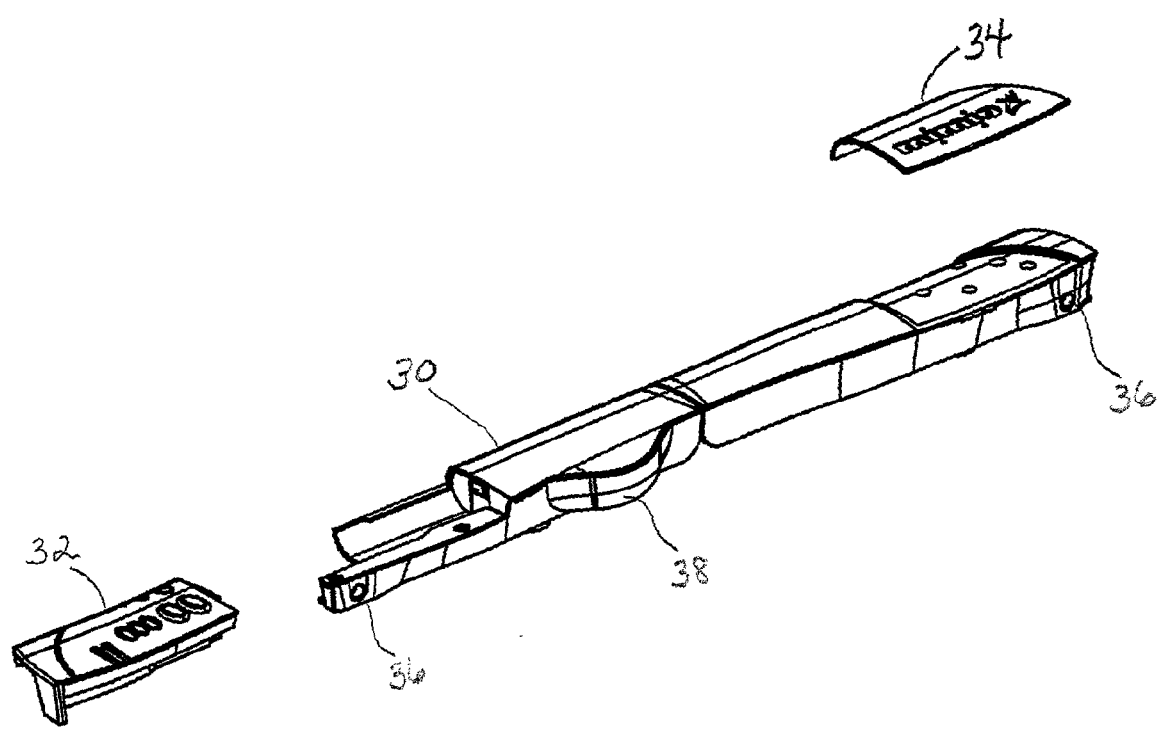
FIG. 5 is a perspective view of a personality module and a base appliance according to an embodiment of the present invention.

As shown in FIGS. 4C and 4D, the lower surface of the base appliance 30 may include one or more attachment mechanisms 40 for removably attaching the detector assembly 14 to the writing surface 26. Examples of suitable attachments mechanisms include, but are not limited to, suction cups, magnets, VELCRO®, hook and loop fasteners, two-sided adhesive, and refreshable contact cement. Alternatively, the base appliance 30 may include one or more attachment mechanisms (not shown) such as brackets for permanently attaching the detector assembly 14 to the writing surface 26. The detector assembly 14 may also have a security mechanism 42 to ensure that the detector assembly 14 cannot be removed from the location where it has been setup. The security mechanism 42 is used in conjunction with permanent attachment mechanisms. Alternatively, the base appliance 30 may be an integral part of the writing surface 26 and not require the permanent attachment mechanisms or the security mechanism 42.

The detector assembly 14 may also include a hinge mechanism 44 permitting the detector assembly 14 to adopt two or more configurations. A hinge mechanism 44 allows the detector assembly 14 to fold into two or more sections to reduce the size of the device for transporting. To allow for the folding, the detector assembly 14 may include flexible wiring which passes through or in proximity of the hinge mechanism 44 to permit electrical communication between the two or more sections of the detector assembly 14. The hinge mechanism 44 may have a positive feedback locking mechanism 46 that is activated when the device is opened to its full opened position as well as closed to its full closed position.

The detector assembly 14 may also be capable of being upgraded when the detector assembly 14 is connected to a processing unit 20. The processing unit 20 upgrades the detector assembly 14 by upgrading the logic and/or firmware on the detector assembly 14. The logic and/or firmware includes logic and/or firmware on the base appliance 30, the personality module 32, or both.

The detector assembly 14 may have various power state options. One option is to allow the user to plug the detector assembly 14 into a wall outlet or other external power supply. An external power supply includes any non-internal power source, such as the power from a computer connected by a Universal Serial Bus (USB) cable. The personality module 32 provides the interface for connecting the detector assembly 14 to the external power supply. The second option is to power the detector assembly 14, for shorter periods of time, by one or more batteries. The base appliance 30 provides a housing (not shown) and a covering plate 48 for the one or more batteries and provides the interface for connecting the detector assembly 14 to the battery source. The first option allows the detector assembly 14 to be always on and ready to record while the second option allows the detector assembly 14 to be portable when necessary. The detector assembly 14 uses battery power only if the wall power or other external power is unavailable. When the detector assembly 14 is battery powered, the user is required to activate or "wake up" the detector assembly 14 in order to record writing. The wake up process may entail pressing a button on the personality module 32 user interface or remotely activating the detector assembly 14. The detector assembly 14 may have several different power modes, a low power mode between data signals, a sleep mode when the detector assembly 14 has not received data from the stylus 12 or eraser 16 for a shorter designated period of time, and a complete shutdown when the detector assembly 14 has not received data from the stylus 12 or eraser 16 for a longer designated period of time.

The detector assembly 14 also works in three functional modes. The first mode allows the detector assembly 14 to record writing using the internal local storage media, referred to as "auto ink capture". The auto ink capture capability allows the base appliance 30 to record data whenever power is provided to the detector assembly 14. This permits the user to record writing when the detector assembly 14 is not attached to a processing unit 20, or is attached to a processing unit 20 but the processing unit 20 is turned off. The second mode allows the detector assembly 14 to send data to a processing unit 20 directly without storing the data locally. The local storage will not be used when the base appliance 30 is connected to a processing unit 20 and software for recording the writing is present. If the software is present on the processing unit 20 but not actively running, the software may optionally launch the software application for recording the writing, or otherwise prepare the processing unit 20, when the processing unit 20 detects positional data is being sent from the detector assembly 14 (also referred to as "instant on"). Those skilled in the art will appreciate, however, that the process described above may be implemented at any level, ranging from hardware to application software and in any appropriate physical location.

If the data is stored on the internal local storage medium, the stored writing may be displayed by connecting the detector assembly 14 to the processing unit 20 and transferring the data from the internal local storage medium to the processing unit 20 (also referred to as "downloading"). For example, the detector assembly 14 is connected to the processing unit 20 through the personality module 32 and the detector assembly 14 and processing unit 20 are synchronized. The data is then downloaded from the base appliance 30 to the processing unit 20 and displayed. The third mode is a combination of the first mode and the second mode. The third mode allows the detector assembly 14 to record writing when the detector assembly 14 does not detect the presence of a processing unit 20 and then subsequently attach the processing unit 20 or turn the processing unit 20 on, optionally download the stored writing to the processing unit 20, and then continue to send data directly from the detector assembly 14 to a processing unit 20 without storing the data locally.

Figure 6:
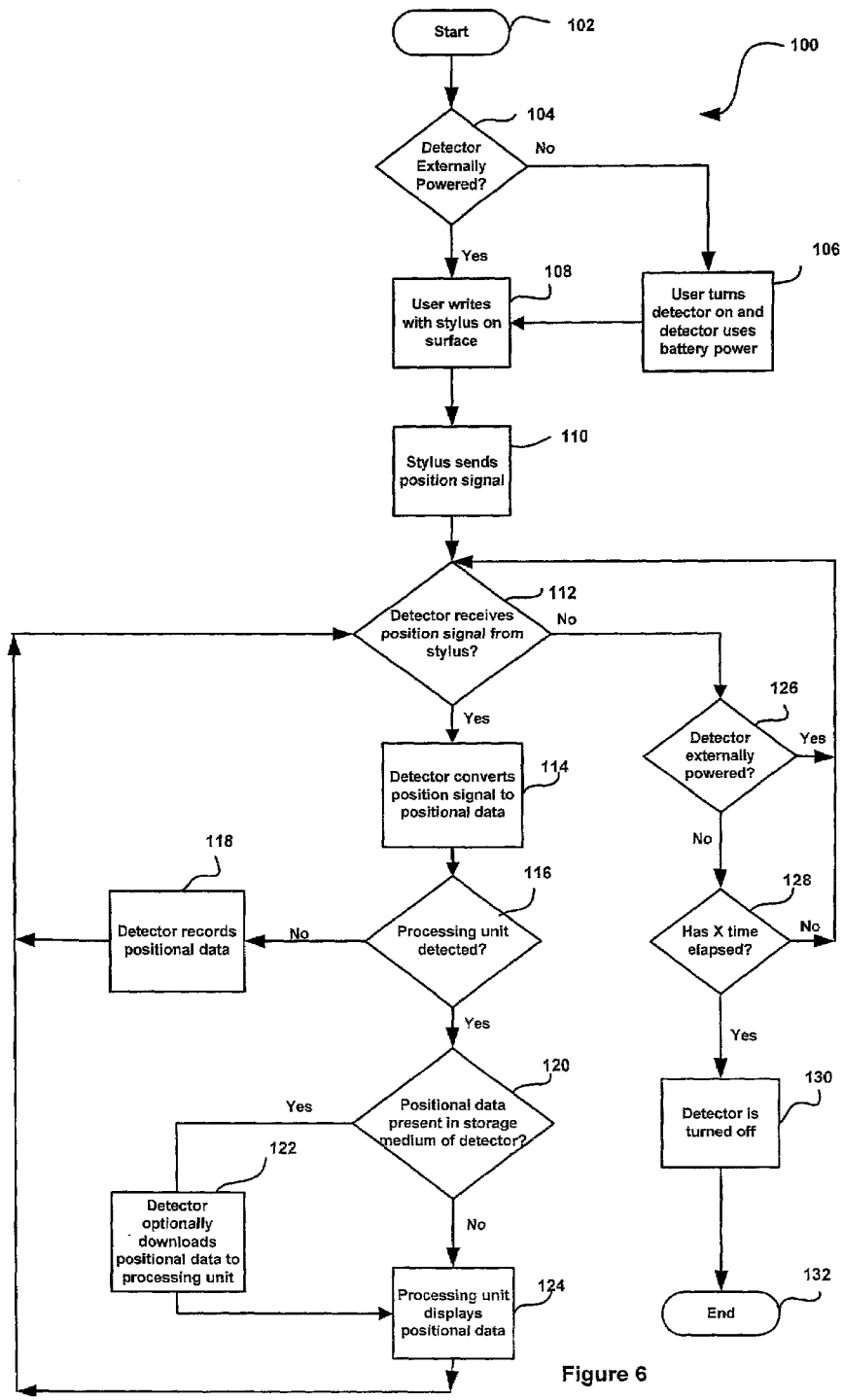
FIG. 6 is a flow diagram showing a method of recording a writing according to an embodiment of the present invention.

FIG. 6 shows a method of recording a writing according to the present invention. A user begins a recording session (step 102) by confirming whether the detector assembly 14 is connected to an external power supply (step 104). If the detector assembly 14 is not connected to an external power supply, the user must activate or "turn on" the detector assembly 14 (step 106) before proceeding and the detector assembly 14 will use battery power. The user then begins writing on the writing surface 26 with the stylus 12 (step 108). When the stylus 12 is disposed adjacent to the writing surface 26, the stylus 12 sends a position signal (step 110) to the detector assembly 14. When the detector assembly 14 receives the position signal from the stylus 12 (step 112), the detector assembly 14 converts the position signal to positional data (step 114). The detector assembly 14 verifies whether a processing unit 20 is connected and turned on (step 116). If no processing unit 20 is detected, the detector assembly 14 records the positional data on the internal local storage medium (step 118). If a processing unit 20 is detected, the detector assembly 14 verifies if positional data is present in the internal local storage medium (step 120). If positional data is present in the internal local storage medium, the processing unit 20 allows the user to select whether to download the positional data to the processing unit 20 (step 122) or to display the current positional data received by the detector assembly 14 (step 124). Alternatively, the processing unit 20 may include a preselected or "default" option when positional data is present in the internal local storage medium such that no user interaction is required unless the user does not want the default option. If no positional data is present in the internal local storage medium, the processing unit 20 proceeds to display the current positional data (step 124).

If the detector assembly 14 does not receive a position signal from the stylus 12 (step 112), the detector assembly 14 confirms how the detector assembly 14 is being powered, externally by a wall outlet or other external power supply, or internally by a battery power (step 126). If the detector assembly 14 is battery powered and the detector assembly 14 has not received data from the stylus 12 or eraser 16 for a designated period of time (step 128), the detector assembly 14 will shutdown completely in order to preserve the battery power (step 130). The detector assembly 14 may also have a partial shutdown level or "sleep mode" (step not shown) when the detector assembly 14 is battery powered and a shorter designated period of time has elapsed since the detector assembly 14 has received a position signal from the stylus 12 or eraser 16 in which the detector assembly 14 turns off selected parts of the detector assembly 14.

When the detector assembly 14 receives a position signal from the stylus 12 or eraser 16 (step 112) after the detector assembly 14 has partially shutdown, the detector assembly 14 automatically reactivates and the detector assembly 14 begins converting the position signal to positional data (step 114). If the detector assembly 14 has completely shutdown (step 130), the recording session has ended (step 132) and the user needs to begin another session in order to record the writing.

Figure 7:
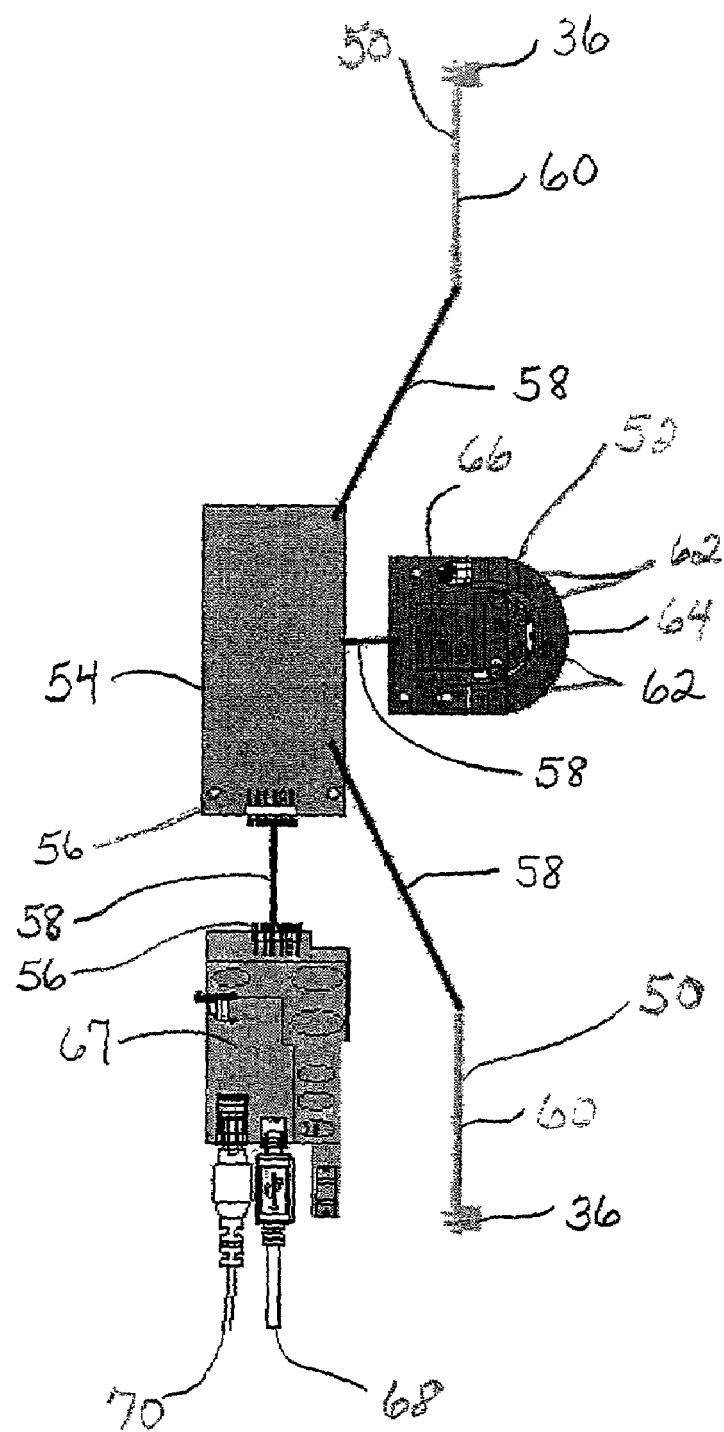
FIG. 7 is a schematic top view of components of the detector assembly according to an embodiment of the present invention.

FIG. 7 shows a schematic top view of components of the detector assembly 14. In one embodiment, the base appliance 30 includes two position signal receiver modules 50, a timing signal receiver module 52, a main processing module 54, an electrical system interface 56 for the personality module 32 and optional connecting wires 58. The electrical system interface 56 may be a standard pin plug connection, such as in a receptacle and plug configuration. Each module has its own interfaces and connections. It will be apparent to those of ordinary skill in the art, however, that other configurations may also be envisioned such as more than two position signal receiver modules, more than one timing signal receiver module, and/or more than one electrical system interface for multiple personality modules. Additionally, the components may be arranged differently and/or one or more of the components may be combined.

The position signal receiver modules 50 provide position signal gathering for the base appliance 30. In one embodiment, each position signal receiver module 50 includes a position signal receiver 36 and a signal conditioning circuit 60. A signal conditioning circuit 60 may include filtering and/or amplification. A variety of position signal receivers 36, such as different kinds of condenser microphones or other transducers such as piezoelectric transducers, may be used. A condenser microphone is a transducer used to convert acoustical motions in the atmosphere into signals in electrical circuits. A condenser microphone includes a flexible diaphragm that forms one plate of a capacitor. When a sound field excites the diaphragm, the capacitance between two plates varies according to the variation in the sound pressure. The capacitance change produces a measurable electrical signal that is proportional to the dynamic sound field. Condenser microphones are capable of measuring sound pressures over a wide range of frequencies. In one embodiment, the condenser microphone is a conventional condenser microphone in which a direct current (DC) voltage is applied to one plate of the capacitor to maintain the charge on the capacitor. In another embodiment, the condenser microphone is a pre-polarized condenser microphone in which one of the plates contains a permanent charge coating, and the DC bias voltage is not necessary. In another embodiment, the condenser microphone may be directional or omnidirectional. The condenser microphone may have a frequency characteristic suitable for detecting the signal transmitted from the stylus. In one embodiment, the condenser microphone has a nominal frequency range from about 1 Hz to about 100 kHz, and in another embodiment, the condenser microphone has a nominal frequency range from about 50 Hz to about 20 kHz. It will be apparent to those of ordinary skill in the art that other position signal receivers may also be used in the position signal receiver modules 50, such as optical detectors for detecting the angle-of-arrival of the signal.

The signal conditioning circuit 60 amplifies the signal received from the position signal receiver 36 and makes the signal suitable for transport over the connecting wire 58 to the main processing module 54. The circuitry may also provide some early filtering in order to eliminate audio and other undesirable signals. The position signal receivers 36 are maintained at a predetermined distance relative to one another. The position signal receivers 36 separation and angle to the stylus 12 or eraser 16 defines the base resolution of the transcription system 10. The signal receiver modules 50 are preferably placed close to the writing surface 26 to improve the data capture capability of the transcription system 10 and maintain an overall low profile for the detector assembly 14. The signal receiver module 50 may also include a gain control line to control the gain. The gain changing improves the range of the detector assembly 14. The position signal receivers 36 are arranged to have a clear line-of-site view to the entire writing surface 26.

The timing signal receiver module 52 provides a wide angle receiver for the timing signal emitted by the stylus 12 or eraser 16. In one embodiment, the timing signal receiver module 52 includes one or more photo diodes 62, a lens 64, and a signal conditioning circuit 66 to amplify and filter the signal from the photo diodes 62 and make the signal suitable for transport over the connecting wire 58 to the main processing module 54. The timing signal receiver module 52 is arranged to have a clear line-of-site view of the entire writing surface 26. In one embodiment, the photo diodes 62 are infrared diodes. It will be apparent to those of ordinary skill in the art that other signal detectors may also be used in the timing signal receiver module 52, such as RF detectors.

The main processing module 54 contains the remaining amplifiers and filters used for processing the signals from the two position signal receivers and the timing signal receiver. The main processing module 54 also contains logic for performing the various calibration and calculation functions to process the incoming raw sensor data and convert the analog signals into positional information. The logic may employ a variety of methodologies for detecting the location of the positional signal. In one embodiment, the method uses a signal threshold level to determine the time-of-arrival of the incoming signal. In another embodiment, the method uses a shape-based matching filter to determine the time-of-arrival of the incoming signal by examining its shape.

The main processing module 54 additionally provides a central location into which all other components can interface, including the personality module 32. The main processing module 54 is arranged to provide a convenient peripheral attachment location. The main processing module 54 also contains internal local, non-volatile, storage medium which allows the detector assembly 14 to track and store the positional information when not attached to a processing unit 20.

The personality module 32 provides the user interface to access the software and hardware functionality. The personality module includes a circuit board 67 containing logic for performing a variety of tasks. The personality module circuit board 67 attaches to the main processing module 54 at the electrical system interface 56 and is removable by the user. The attach/detach process does not require any tools or separate hardware. Changing the personality module 32 allows the detector assembly 14 user interface to be customized according to the personality module 32 plugged into the base appliance 30. The personality module 32 may be designed to perform a variety of different system functions with interfaces unique to a particular design. Personality modules allow for easier integration of future devices with the base appliance 30. Personality modules allow the base appliance 30 to be connected directly to various devices such as a computer, a printer, a network, a wireless device, or other peripheral device. The personality module circuit board 67 may include several connectors, such as a Mini-B Universal Serial Bus (USB) connector 68 for connection to a processing unit 20, a power connector 70 for connection to a wall outlet or other external power supply, and a pin receptacle 56 for connection to the main processing module 56 of the base appliance 30. The personality module 32 may also be capable of upgrading logic and/or firmware on the base appliance 30.

Figure 8:
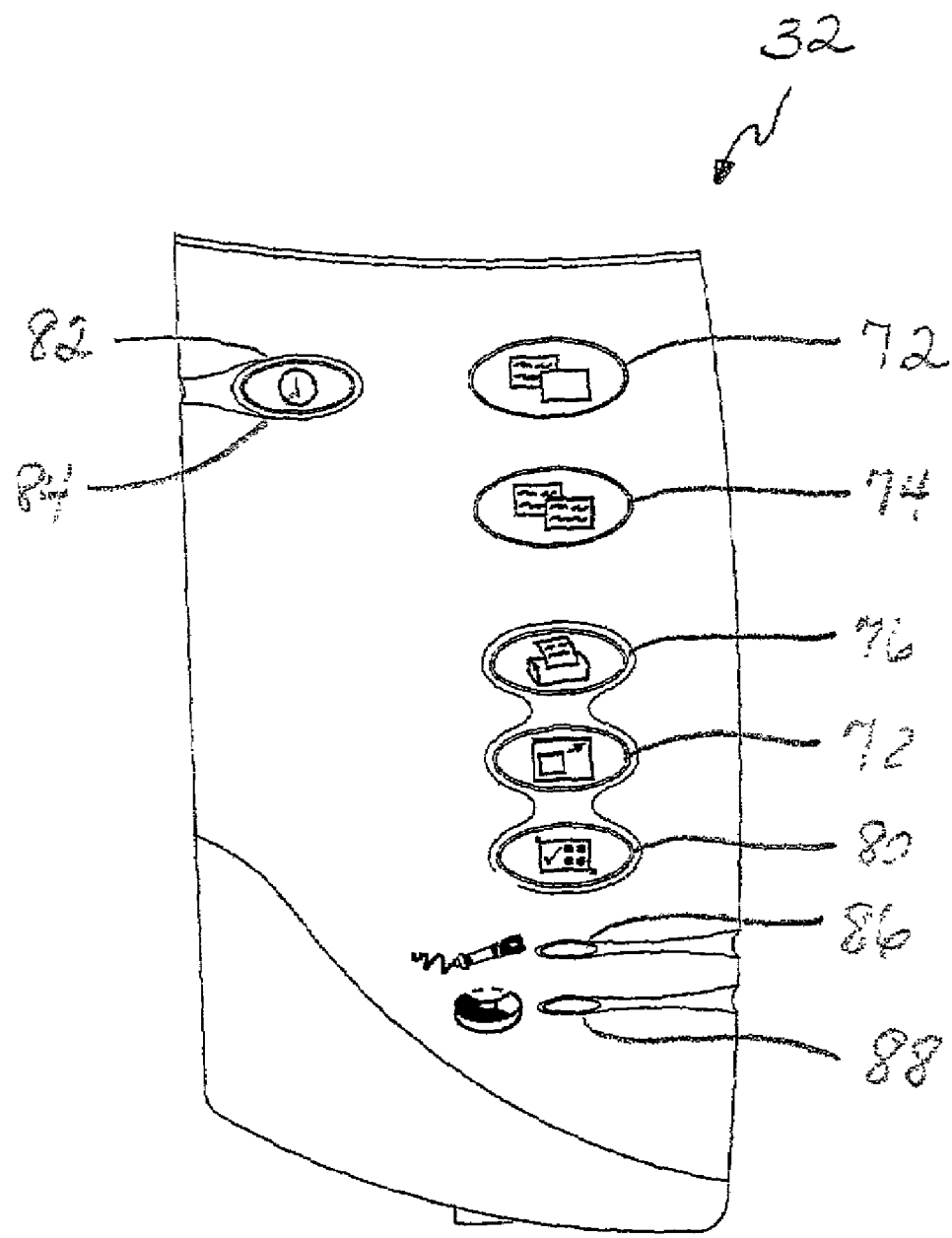
FIG. 8 is a schematic top view of a personality module according to an embodiment of the present invention.

FIG. 8 shows a schematic top view of one personality module according to an embodiment of the present invention. The personality module 32 includes a new page button 72, a tag button 74, a print page button 76, a maximize board button 78, a locate control panel button 80, a battery power ON/OFF button 82, and a recessed clear memory button (not shown). The new page button 72 causes the detector assembly 14 to insert a message into the data stream of the transcription system 10 indicating that the board has been fully cleared and the user is ready to continue writing data on a fresh writing area space. When the detector assembly 14 is connected to a processing unit 20 running ink-capturing software, the software handles the message by clearing the displayed board space. When the detector assembly 14 is not connected to a processing unit 20, the message along with the other stroke data is stored in the local storage medium in the base appliance 30. When the data is downloaded from the detector assembly 14, the message is retained and passed with the rest of the positional data.

The tag page button 74 causes the detector assembly 14 to insert a message into the data stream of the transcription system 10 indicating that the user desires to take a "snapshot" of the current writing area state and mark it for possible later quick access. When the detector assembly 14 is connected to a processing unit 20 running ink-capturing software, the software handles the message by inserting a bookmark of the copied board. When the detector assembly 14 is not connected to the processing unit 20, the message along with the other positional data is stored in the local storage medium in the base appliance 30. When the data is downloaded from the detector assembly 14, the message is retained and passed along with the rest of the positional data.

The print page button 76 causes the detector assembly 14 to insert a message into the data stream of the transcription system 10 that the user desires to print the writing area space in its current state. When the detector assembly 14 is connected to a processing unit 20 running ink-capturing software, the software handles the message by sending a print job of the current writing area display to the default printer. When the detector assembly 14 is not connected to a processing unit 20, the button is inactive and ignored.

The maximize board button 78 causes the detector assembly 14 to insert a message into the data stream of the transcription system 10 that the user desires to maximize the writing area display on the processing unit 20. When the detector assembly 14 is connected to a processing unit 20 running ink-capturing software, the software handles the message by maximizing, minimizing, or restoring the writing area display on the screen. When the detector assembly 14 is not connected to the processing unit 20, the button is inactive and ignored.

The locate control panel button 80 causes the detector assembly 14 to insert a message into the data stream of the transcription system 10 that the user desires to setup a control panel on the writing area space. When the detector assembly 14 is connected to a processing unit 20 running ink-capturing software, the software handles the message by prompting the user to input location points on the control panel using a stylus 12. When the detector assembly 14 is not connected to the processing unit 20, the button is inactive and ignored.

The battery power on/off button 82 toggles the detector assembly 14 between on and off when battery power is available. When the detector assembly 14 is externally powered, the button is inactive and ignored. The recessed memory clear button (not shown) deletes all the data stored in memory. The detector assembly 14 must be on for the button to work.

In addition to the buttons, the personality module 32 may also include a number of LEDs or LCDs. The LEDs on the personality module may indicate the status of the power, the pen activity, and the memory. For example, a power LED 84 is capable of showing when the detector assembly 14 is on or off. When batteries power the assembly, the LED 84 may also indicate the battery level. A pen down LED 86 is capable of showing when the pen is active, not active, or low on battery power. The memory indicator LED 88 is capable of showing when the memory is empty, data is being downloaded from the memory to a computer, and memory is at various levels, such as less than 50% full, greater than 50% but less than 75% full, greater than 90% full, 95% full, etc. The personality module may also contain a buzzer for tone generation to provide similar indications.

A wide variety of additional personality modules may also be envisioned and are intended to fall within the scope of the present invention. For example, a wireless personality module eliminates the need to connect the detector assembly 14 directly to a peripheral device, such as a personal computer, laptop computer, personal digital assistant (PDA), or handheld computing device. The wireless link would essentially act as a cable replacement providing a point-to-point connection. Information may be transferred back and forth from the personality module to the peripheral device using any point-to-point or point-to-multipoint communication standard such as Bluetooth or Infrared Data Association (IrDA), or any other proprietary communication method.

The wireless personality module interface includes a buffering chip installed between the raw data and the wireless radio which enables the personality module to buffer data while the radio is receiving information from the peripheral device or host.

The detector assembly 14 may send data to the peripheral device as the data is being generated (live ink) or store the data in the local storage media of the detector assembly 14 to be retrieved by the peripheral device at a later time. The detector assembly 14 may also receive data originating from the peripheral device and store or transfer the information.

A network personality module connects the detector assembly 14 to a network enabling live ink capture through the network and allowing stored ink files to be accessed from any computer over the network. The network personality module interface combines local storage and a network processor. The network personality module may also include wireless networking. The wireless networking would allow the detector assembly 14 to be connected to the network without requiring a direct network connection.

A printer personality module connects the detector assembly 14 directly to a printer, bypassing the need for a computer. The printer personality module interface receives the positional data from the base appliance and sends raster or vector information to the printer.

A removable storage personality module allows the detector assembly 14 to transfer the raw location information directly to a removable storage media, such as compact flash, Smartmedia®, Sony Memorystick™, floppy disk, Iomega® zip/click disk, or USB flash. The removable media is inserted into the removable storage personality module, the information is recorded on the removable media, and the media is removed. The removable media may be synchronized with a computer and the data downloaded.

An audio personality module allows the detector assembly 14 to combine an audio signal with the positional data received. The audio personality module receives the audio signal and synchronizes the audio signal with the positional data. The detector assembly 14 may then store the combined information in the local storage media of the detector assembly 14, send the combined information to a peripheral device, and/or display the combined information on the peripheral device.

A number of embodiments of the invention have been described. Nevertheless, it will be understood that various modifications may be made without departing from the spirit and scope of the invention. Accordingly, other embodiments are within the scope of the following claims.

What is claimed is:

1. A system for recording a writing performed on a surface comprising:

a stylus comprising a first signal transmitter for transmitting position signals corresponding to positional data representative of the writing when the stylus is disposed adjacent to the surface; and a detector assembly comprising a plurality of position signal receivers for receiving the position signals transmitted by the stylus and further comprising a storage medium for recording the positional data; and a detachable processing unit for displaying the positional data representative of the writing, wherein said system has an ability to record writing while the processing unit is not connected to the system.

2. The system of claim 1 wherein the stylus further comprises a second signal transmitter for transmitting timing signals and wherein the detector assembly further comprises a timing signal receiver for receiving the timing signals transmitted by the stylus.

3. The system of claim 2 wherein the timing signals are infrared light signals.

4. The system of claim 3 wherein the timing signal receiver is an infrared detector.

5. The system of claim 1 wherein the position signals are ultrasound signals.

6. The system of claim 1 wherein the detector assembly further comprises logic for converting the position signals to the positional data.

7. The system of claim 1 wherein the processing unit is a desktop computer, a laptop computer, a wireless device, a hand-held device, a printer, or any combination thereof.

8. The system of claim 1 further comprising a display device and a user interface.

9. The system of claim 1 further comprising an eraser comprising a third signal transmitter for transmitting position signals corresponding to positional information representative of removal of the writing when the eraser is disposed adjacent to the surface.

10. The system of claim 1 wherein the plurality of position signal receivers are condenser microphones.

11. The system of claim 10 wherein the condenser microphones are omnidirectional condenser microphones.

12. The system of claim 10 wherein the condenser microphones are pre-polarized condenser microphones.

13. The system of claim 10 wherein the condenser microphones have a frequency range of about 1 Hz to about 100 kHz.

14. The system of claim 13 wherein the condenser microphones have a frequency range of about 50 Hz to about 20 kHz.

15. The system of claim 1 wherein the detector assembly comprises a base appliance for receiving the position signals from the first signal transmitter and for recording the positional data, and a personality module removably attachable to the base appliance for providing a user interface for the detector assembly.

16. The system of claim 15 wherein the stylus further comprises a second signal transmitter for transmitting timing signals and wherein the base appliance further comprises a timing signal receiver for receiving the timing signals from the stylus.

17. The system of claim 16 wherein the timing signal receiver is an infrared detector.

18. The system of claim 15 wherein the base appliance further comprises logic for converting the position signals to positional data.

19. The system of claim 18 wherein the plurality of position signal receivers are condenser microphones.

20. The system claim 19 wherein the condenser microphones are omnidirectional condenser microphones.

21. The system of claim 19 wherein the condenser microphones are pre-polarized condenser microphones.

22. The system of claim 19 wherein the condenser microphones have a frequency range of about 1 Hz to about 100 kHz.

23. The system of claim 22 wherein the condenser microphones have a frequency range of about 50 Hz to about 20 kHz.

24. The system of claim 15 wherein the personality module is in communication with said processing unit.

25. The system of claim 15 wherein the user interface of the personality module is buttons, LEDs, LCDs, buzzers, or any combination thereof.

26. The system of claim 15 wherein the personality module further comprises logic.

27. The system of claim 1 wherein the detector assembly is powered by a power supply wherein the power supply is a battery or an external power supply.

28. The system of claim 1 wherein the detector assembly further comprises an attachment mechanism for permanently attaching the detector assembly to the writing surface.

29. The system of claim 1 wherein the detector assembly further comprises a security mechanism for securing the detector assembly to the writing surface.

30. The system of claim 1 wherein the detector assembly further comprises an attachment mechanism for removably attaching the detector assembly to the writing surface.

31. The system of claim 1 wherein the detector assembly further comprises a hinge mechanism for folding the detector assembly.

32. The system of claim 31 wherein the hinge mechanism comprises a positive feedback locking mechanism.

33. The system of claim 1 wherein the detector assembly has a plurality of power states.

34. The system of claim 1 wherein the writing includes erasing.

35. The system of claim 1 wherein the surface is a whiteboard, a blackboard, a clipboard, a desktop, a wall, a projection screen, a flip chart tablet, a glass pane, or an active display.

36. A system for recording a writing performed on a surface comprising:
   A stylus comprising a first signal transmitter for transmitting position signals corresponding to positional data representative of the writing when the stylus is disposed adjacent to the surface and
   A detector assembly comprising a plurality of condenser microphones for receiving the position signals transmitted by the stylus; and
   a detachable processing unit for displaying the positional data representative of the writing, wherein said system has an ability to record writing while the processing unit is not connected to the system.

37. The system of claim 36 wherein the detector assembly further comprises logic for converting the position signals to the positional data, and a storage medium for recording the positional data.

38. The system of claim 36 wherein the stylus further comprises a second signal transmitter for transmitting timing signals and wherein the detector assembly further comprises an infrared detector for receiving the timing signals transmitted by the stylus.

39. A detector for use in a transcription system, the transcription system including a stylus for transmitting signals when the stylus is disposed adjacent to a surface, the detector comprising:
   a base appliance comprising a plurality of signal receivers for receiving the position signals transmitted by the stylus, logic for converting the position signals to positional data, and an internal local storage medium for recording the positional data, and
   a personality module removably attachable to the base appliance for providing a user interface for the detector.

40. The detector of claim 39 wherein the base appliance further comprises a timing signal receiver for receiving timing signals transmitted by the stylus.

41. The detector of claim 40 wherein the timing signal receiver is an infrared detector.

42. The detector of claim 39 wherein the plurality of signal receivers are condenser microphones.

43. The detector of claim 42 wherein the condenser microphones are omnidirectional condenser microphones.

44. The detector of claim 42 wherein the condenser microphones are pre-polarized condenser microphones.

45. The detector of claim 42 wherein the condenser microphones have a frequency range of about 1 Hz to about 100 kHz.

46. The detector of claim 45 wherein the condenser microphones have a frequency range of about 50 Hz to about 20 kHz.

47. The detector of claim 39 wherein the personality module is in communication with a computer, a wireless device, a network, a printer, or a removable storage medium.

48. The detector of claim 39 wherein the personality module further comprises logic.

49. The detector of claim 39 wherein the detector is powered by a power supply wherein the power supply is a battery or an external power supply.

50. The detector of claim 39 further comprising an attachment mechanism for permanently attaching the detector to the writing surface.

51. The detector of claim 50 further comprising a security mechanism for securing the detector to the writing surface.

52. The detector of claim 39 further comprising an attachment mechanism for removably attaching the detector to the writing surface.

53. The detector of claim 39 further comprising a hinge mechanism for folding the base appliance.

54. The detector of claim 39 wherein the timing signals are infrared light signals.

55. The detector of claim 39 wherein the position signals are ultrasound signals.

56. A detector for use in a transcription system, the transcription system including a stylus for transmitting signals when the stylus is disposed adjacent to a surface, the detector comprising:
   a base appliance comprising a plurality of condenser microphones for receiving position signals transmitted by the stylus, the position signals corresponding to positional data representative of writing performed on the surface; and
   a personality module removably attachable to the base appliance for providing a user interface for the detector.

57. The detector of claim 56 wherein the base appliance further comprises logic for converting the position signals to the positional data, and an internal local storage medium for recording the positional data.

58. A method for recording a writing performed on a surface comprising:
   providing a detector comprising a plurality of condenser microphones capable of receiving an acoustic signal;
   sending the acoustic signal from a stylus at a position on the surface when the stylus is disposed adjacent to the surface;
   receiving the acoustic signal with the plurality of condenser microphones;
   converting the acoustic signal to positional data;
   recording the positional data; and
   repeating the sending step, receiving step, converting step, and recording step to produce an image corresponding to the writing; and
   downloading the positional data from the detector to a detachable processing unit.

59. The method of claim 58 wherein the condenser microphones are omnidirectional condenser microphones.

60. The method of claim 58 wherein the condenser microphones are pre-polarized condenser microphones.

61. The method of claim 58 wherein the acoustic signal is an ultrasound signal.

62. The method of claim 58 further comprising
   sending a timing signal from the stylus when the stylus is disposed adjacent to the surface; and
   receiving the timing signal by a timing signal receiver located on the detector.

63. The method of claim 62 wherein the timing signal is an infrared light signal and the timing signal receiver is an infrared detector.

64. The method of claim 58 further comprising preparing the processing unit for recording the writing.

65. The method of claim 58 wherein the processing unit is a desktop computer, a laptop computer, a wireless device, a hand-held device, a printer, or any combination thereof.

66. The method of claim 58 further comprising
   displaying the positional data by a processing unit.

67. The method of claim 66 wherein the processing unit is a desktop computer, a laptop computer, a wireless device, a hand-held device, a printer, or any combination thereof.

68. The method of claim 67 wherein the processing unit records the positional data.

69. A method for recording a writing performed on a surface comprising:
   sending a position signal from a stylus when the stylus is disposed adjacent to the surface;
   receiving the position signal with a detector comprising a plurality of signal receivers;
   converting the position signal to positional data using logic located on the detector;
   recording the positional data on a storage medium located on the detector;
   repeating the sending step, receiving step, converting step, and recording step to produce an image corresponding to the writing; and
   downloading the positional data from the detector to a detachable processing unit.

70. The method of claim 69 wherein the plurality of signal receivers comprise condenser microphones.

71. The method of claim 70 wherein the condenser microphones are omnidirectional condenser microphones.

72. The method of claim 70 wherein the condenser microphones are pre-polarized condenser microphones.

73. The method of claim 69 wherein the position signal is an ultrasound signal.

74. The method of claim 69 further comprising
   sending a timing signal from the stylus when the stylus is disposed adjacent to the surface; and
   receiving the timing signal with the plurality of signal receivers.

75. The method of claim 74 wherein the timing signals are infrared light signals and the plurality of signal receivers comprise infrared detectors.

76. The method of claim 69 wherein the processing unit is a desktop computer, a laptop computer, a wireless device, a hand-held device, a printer, or any combination thereof.

77. The method of claim 76 further comprising
   displaying the positional data by the processing unit.

78. The method of claim 77 further comprising
   repeating the sending step, the receiving step, the converting step, and the displaying step to produce an image corresponding to the writing.

* * * * *